A. E. SMITH.
Carriage Axle.
No. 3,991.
Reissued May 24, 1870.
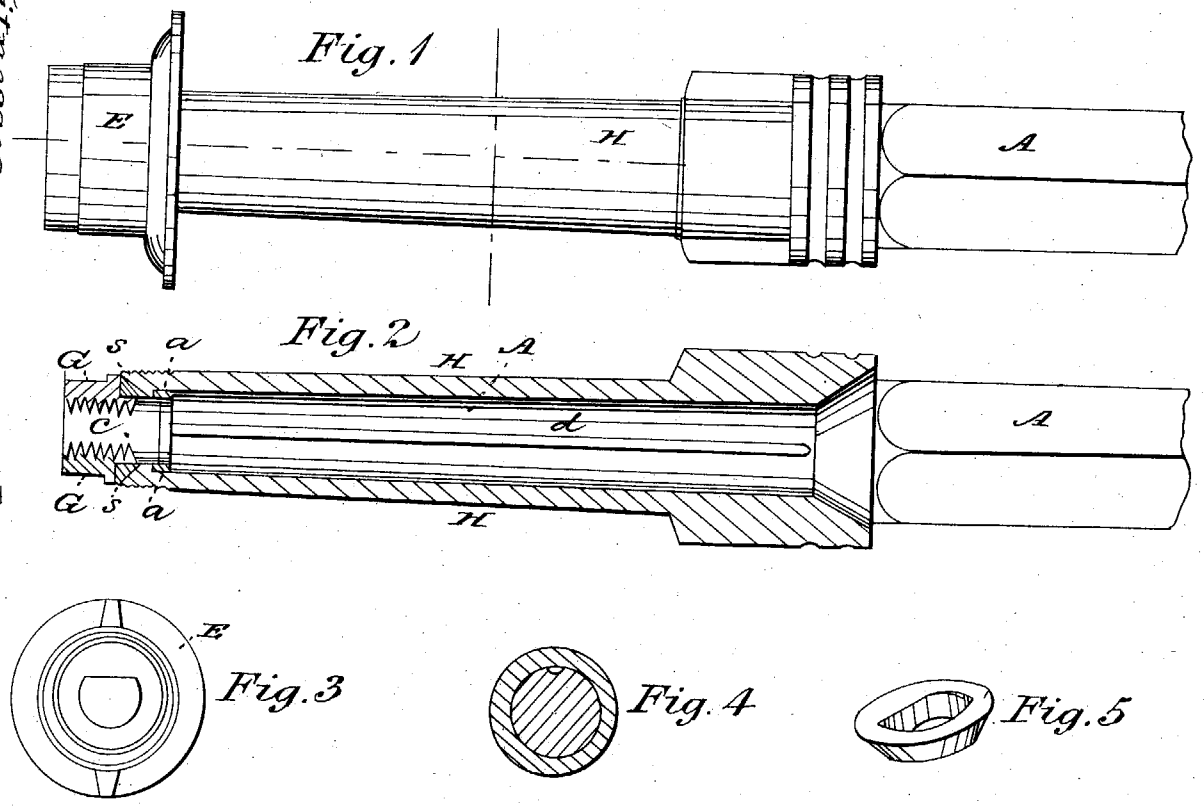
Witnesses:
E. W. Anderson
James P. Graves
Inventor:
Alfred E. Smith
Chapman, Horton & Co.
Atty
N. PETERS, PHOTO-LITHOGRAPHER, WASHINGTON, D. C.

United States Patent Office.

ALFRED E. SMITH, OF BRONXVILLE, NEW YORK.

*Letters Patent No.* 98,436, *dated December* 28, 1869; *reissue No.* 3,991, *dated May* 24, 1870.

IMPROVEMENT IN CARRIAGE-AXLES.

The Schedule referred to in these Letters Patent and making part of the same.

*To all whom it may concern:*

Be it known that I, ALFRED E. SMITH, of Bronxville, in the county of Westchester and State of New York, did invent a new and useful Improvement in Carriage-Axles; and I do hereby declare the following to be a full, clear, and exact description thereof, which will enable those skilled in the art to make and use the same, reference being had to the accompanying drawing forming part of this specification, in which—

Figure 1 is a view of my improved axle complete.

Figure 2 is a vertical longitudinal section of the same, with the cap-nut removed.

Figure 3 is an end view, with the cap-nut removed.

Figure 4 is a transverse section of the spindle and axle-box.

Figure 5 is a perspective view of the D-shaped conical washer.

This invention relates to carriage or wagon-axles, and consists in placing at the end of an axle, between the nut and the axle-box or skein, a D or any other interior angular-shaped conical washer, and forming within the axle-box, in connection with the spindle and conical washer, a recess for containing lubricating substance, all of which will hereafter be described.

A in the drawing represents the axle.

A′, the spindle or journal, formed with a groove or channel, *d*, extending from the shoulder, more or less, the full length of the axle-spindle or journal A′.

The outer end or nib of this spindle or journal, upon which the nut G is screwed to secure the axle-box or skein upon the axle, is formed flat, or cut off on one side until it assumes a D or any other angular shape, designated by the letter C in fig. 2.

This form or figure is given to the surface of the nib and a portion of the spindle or journal for the purpose of holding rigidly a conical washer, preventing its revolution with the axle-box or skein.

Upon this D or angular-shaped nib of the spindle or journal-end *c*, part of which is threaded, is placed a conical washer, S, formed of iron, steel, or other suitable material, corresponding on its interior surface with the D or angular-shaped exterior surface of the threaded nib and portion of the axle-spindle or journal A′.

The axle-box or skein H resembles somewhat those of ordinary construction, with the exception that it is formed with a beveled cavity at its front end of a concave form, to receive the abutting incline surface of the conical washer S, and a recess, *a*, between the bevel point of the washer and the front shoulder of the axle-spindle or journal A′.

Into this recess *a* the lubricating substance is conducted by the channel or groove *d*, or, if desired, the said channel or groove *d* may be formed with the axle-box or skein, producing the same result.

The object of this groove is to furnish means for a thorough lubrication of the spindle or journal A′ and the concave portion on the front of the axle-box or skein H, which bears upon the beveled periphery of the conical washer S.

G represents the nut fitted to the threads formed on the nib of the spindle or journal A′, serving the purpose of retaining the axle-box or skein H on the axle-spindle or journal A′, and also of forcing up the conical washer S as the axle-box or washer wears, thus causing the wheel to run still, steady, and true.

Upon the outer end of the axle-box or skein H is formed a screw-thread, upon which is screwed a capped nut, E, designed to cover the axle-nut G, and, at the same time, prevent the wheel-hub from slipping off of the axle-box or skein should the said box or skein become loose in the hub; also prevents sand and other foreign substances from entering the washer and spindle or journal of the axle.

Having thus described my invention,

What I claim as new, and desire to secure by Letters Patent, is—

1. The D or any shaped conical metallic washer S, located at the end of an axle, abutting with its incline against the axle-skein or box, and with its sides against the nut and axle, substantially as shown and described.

2. In combination with the foregoing, the recess *a*, formed between the spindle, conical washer, and axle-skein or box, substantially as shown and described.

3. The spindle A, with or without the groove *d*, in combination with the threaded nib *c*, conical washer S, recess *a*, and nut G, substantially as hereinbefore mentioned.

To the above I have signed my name this 2d day of April, 1870.

ALFRED E. SMITH.

Witnesses:

GEO. H. RUSSELL,

JOHN L. BROWER.